United States Patent [19]

Baba et al.

[11] Patent Number: 4,861,611

[45] Date of Patent: Aug. 29, 1989

[54] FRACTIONATED SOFT LAURIN FAT AND FOOD CONTAINING THE SAME

[75] Inventors: Hideki Baba, Sennan; Hirokazu Maeda, Sakai; Akira Kurooka, Sennan; Atsushi Nago, Izumisano, all of Japan

[73] Assignee: Fuji Oil Company, Limited, Osaka, Japan

[21] Appl. No.: 198,842

[22] Filed: May 26, 1988

[30] Foreign Application Priority Data

May 30, 1987 [JP] Japan .................................. 62-137109
Dec. 16, 1987 [JP] Japan .................................. 62-319840

[51] Int. Cl.⁴ .......................... A23D 5/00; A23G 3/00
[52] U.S. Cl. .............................. 426/601; 260/410.7; 426/609; 426/660
[58] Field of Search ............... 426/601, 606, 607, 660; 260/410.7

[56] References Cited

FOREIGN PATENT DOCUMENTS 81881 6/1983 European Pat. Off. ............ 426/660
74505 7/1978 Japan .................................. 426/607
26152 3/1981 Japan .................................. 426/607

OTHER PUBLICATIONS

Traitler and Dietfenbacher, Palm Oil and Palm Kernel Oil in Food Products, JAOCS, vol. 62, 2/85, pp. 417-421.

Primary Examiner—Donald E. Czaja
Assistant Examiner—Evan Federman
Attorney, Agent, or Firm—Wenderoth, Lind & Ponack

[57] ABSTRACT

A fat which comprises a soft fat obtained by fractionation of laurin fat having an iodine value of 30-40, a melting point of not higher than 15° C., and SFI of 10-30 at 5° C., 0-20 at 10° C., 0-10 at 15° C., and 0 at 20° C. A food containing the same is also disclosed.

4 Claims, No Drawings

FRACTIONATED SOFT LAURIN FAT AND FOOD CONTAINING THE SAME

FIELD OF THE INVENTION

The present invention relates to a fractionated soft laurin fat and to foods containing the same. More particularly, it relates to a fat having a plain taste and a good melting in the mouth quality which is composed of a fractionated soft fat of laurin fat having a specific composition, and to foods containing the fat as a part or as the sole fatty ingredient therein, which has good melting in the mouth accompanied with cold mouth feel and good taste.

BACKGROUND OF THE INVENTION

Heretofore, a liquid fat has been used for a frying oil or spraying oil because it is not solidified at a low temperature and is easily used. Further, it is also used for various kinds of fatty foods for improving physical properties or melting in the mouth thereof. However, such a liquid fat has inferior stability to oxidation in comparison with a solid fat, and also has other disadvantages such as a oily taste.

On the other hand, laurin fat has good stability to oxidation as well as good melting in the mouth accompanied with cold mouth feel and a plain taste. Therefore, it has been widely used in various fatty foods such as, for example, chocolate; ice confectionery, e.g., ice cream; confectionery, e.g., margarine and shortening; whipped cream, coffee cream and liquid or powdered dairy products, e.g., processed milk; frying oil for butter peanut, etc.; spraying oil for Japanese cracker and the like.

However, it is difficult to use laurin fat in the same manner as a liquid fat because it is hard at a low temperature. Therefore, it is of great significance to develop a fat having good stability to oxidation, good melting in the mouth and a good taste which can be used in the same manner as a liquid oil.

OBJECTS OF THE INVENTION

One object of the present invention is to provide a fat having a plain taste and better oxidation stability in comparison with a liquid fat, said fat being able to be more readily used instead of a conventional liquid fat such as conventional laurin fat or a fractionated soft fat thereof, that is, said fat being softer at a low temperature (in a liquid state at the normal temperature).

Another object of the present invention is to provide food containing the fat as a part or as the sole fatty ingredient thereof having good melting in the mouth and a good taste.

These objects as well as other objects and advantages of the present invention will become apparent to those skilled in the art from the following description.

SUMMARY OF THE INVENTION

It has been found that the above problems of conventional laurin fat and liquid fat can be solved by a soft fat obtained by refractionating a residual soft fat, resulting from fractionation of laurin fat to separate a hard butter component.

That is, according to the present invention, there is provided a fat which comprises a fractionated soft fat of laurin fat having an iodine value of 30–40, a melting point of not higher than 15° C., and a solid fat index (SFI) of 10–30 at 5° C., 0–20 at 10° C., 0–10 at 15° C. and 0 at 20° C. The present invention also provides a food containing the fat as a part or as the sole fatty ingredient thereof.

DETAILED DESCRIPTION OF THE INVENTION

The fractionated soft fat of laurin fat in the present invention can be obtained by fractionating laurin fat such as palm kernel oil, babassu oil, tucum oil, ouricuri oil, murumuru oil, etc., which contain lauric acid (having 12 carbon atoms) as a main constituent fatty acid according to a known fractionation method such as solvent fractionation using acetone, hexane, etc.; fractionation using a surface active agent; dry fractionation using no solvent; Wintering method; or the like. However, accuracy is required in some degree. For example, when fractionation of laurin fat itself is carried out by a single stage fractionation method, a large amount of a solvent is required because a large amount of crystals are produced. In a dry fractionation method, it is required to avoid excessive pressure. On the other hand, when a residual soft fat obtained by separation of a high temperature fraction such as a hard butter component is fractionated, there is no need to pay attention to such accuracy.

In any event, the fractionated soft fat of laurin fat in the present invention has an iodine value of 30–40, a melting point of not higher than 15° C., and SFI of 10–30 at 5° C., 0–20 at 10° C., 0–10 at 15° C. and 0 at 20° C. In the case that the iodine value, melting point and SFI thereof are outside these range, it is difficult to substitute the fractionated soft fat for a liquid fat, or oxidation stability becomes inferior. Therefore, they should be within the above range. The term "melting point" used herein means an ascending melting point.

Particularly, the fat according to the present invention comprising the fractionated soft fat of laurin fat is preferably a fractionated soft fat of palm kernel oil. One example of the fatty acid composition thereof is as follows.

| Fatty acid composition | | | |
|---|---|---|---|
| C 6:0 | 0.6 | C 16:0 | 6.7 |
| C 8:0 | 7.0 | C 18:0 | 1.7 |
| C 10:0 | 4.3 | C 18:1 | 30.9 |
| C 12:0 | 33.8 | C 18:2 | 5.9 |
| C 14:0 | 9.1 | | |

The fat of the present invention can be composed of the fractionated soft fat of laurin fat as its sole ingredient. Or, the fat of the present invention can optionally contain one or more other fats or oils suitable for a desired final product.

The amount of the additives are not limited and can be chosen according to a particular purpose of the fat of the present invention.

The fat of the present invention has a plain taste, good melting in the mouth and good oxidation stability in comparison with a liquid fat. Therefore, the fat according to the present invention can be advantageously used for various foods containing fat, for example, chocolate confectionary; ice confectionery such as ice cream; fats or oils for confectionery such as margarine, shortening and the like; liquid or powdery dairy products such as whipped cream, coffee cream, processed milk and the like; frying oil for butter peanut; and spraying oil for Japanese cracker.

These foods are also within the scope of the present invention. The proportion of the fat of the present invention in the food is not specifically limited and is appropriately chosen based on a particular food and a desired formulation thereof. The fat can be used as a part or as the sole fatty ingredient of the food.

Other ingredients of food are not specifically limited and conventional ingredients can be used according to a particular kind of food.

The present invention is particularly useful for chocolate because the fat of the present invention can be used in the product in any proportion. That is, the fat which is usually used for manufacturing chocolate can be classified roughly into two types, i.e., a tempering type and a non-tempering type. When both types of fats are used simultaneously, blooming may be caused, therefore it is impossible to use both types of fats in any proportion. Thus, heretofore, there has not been chocolate wherein 5-80% by weight of a non-tempering type fat such as laurin fat is used together with a tempering fat such as cacao butter. According to the present invention, it is preferred that the fat of the present invention be used in a chocolate mix in an amount of 5-80% by weight, preferably 30-60% by weight based on the total amount of the fatty ingredient thereof. The chocolate produced according to the present invention preferably includes soft chocolate having soft mouth feel which is preserved at room temperature of not higher than 25° C. and served as it is; ice chocolate which is cast in a tray and cooled to solidify with refrigeration or freezing, then served in a cooling state; chocolate for coating which is used for bread and confectionery as a spread or coating material, particularly, for ice coating which is used for ice confectionery such as ice cream or a shell which is molded in various shapes and filled with ice cream, and the like.

These chocolates can be produced according to a conventional manner by substituting 5-80% by weight of the fatty ingredients in a conventional chocolate formulation with the fractionated soft fat of laurin fat.

Of course, in the present invention, chocolate such as milk chocolate or white chocolate can be produced by using whole milk powder as a part of the raw materials. Therefore, milk fat can be used a part of the fatty ingredients thereof. In this case, tempering treatment is not required, when the chocolate is produced and stored under freezing. On the other hand, it is preferable to effect tempering treatment, when the chocolate is produced and stored under refrigeration or normal temperature.

The shape of these chocolate can be varied depending upon the above uses. For example, molded chocolate may be in a plate-like shape and ice chocolate may be in a massive shape. Further, these chocolates may be in a powder, in the form of tips, rods, pellets, lamellas, stones, chanks and the like, which are suitable for using as a topping of ice confectionery such as ice cream or dessert. Particularly, these chocolates may be normal dark chocolate as well as colored chocolate of various colors. For example, ice confectionary or dessert wherein chocolate having various colors or tastes obtained by mixing fruits such as orange, lemon, strawberry and the like, or nuts such as hazelnut, peanut, almond and the like are dispersed therein providing a beautiful appearance together with good taste and, therefore, it stimulates one's appetite further.

On the other hand, for example, chocolate obtained by using a liquid fat such as soy bean oil instead of the fractionated soft fat of laurin fat of the present invention has poor stability and no cold mouth feel.

By the way, the present inventors have found that, if a large amount of the residual soft fat obtained by separating a hard butter component of lauric type fat having SFI of 20-35 at 35° C., 15-30 at 10° C., 10-25 at 15° C., 2-5 at 20° C. and less than 3 at 25° C. is used with cacao butter to produce chocolate, a tempering treatment can be effected to prevent blooming. Then, the inventors have filed an application (Japanese Patent Application No. 36299/1987 entitled "Chocolate having cold mouth feel"). However, in such chocolate, there is a tendency to become somewhat harder with time. On the other hand, in the chocolate of the present invention, such change in hardness over time is improved.

The following Examples and Comparative Examples further illustrate the present invention in detail but are not to be construed to limit the scope thereof. In the Examples and Comparative Examples, all the "parts" and "%'s are by weight, unless otherwise stated.

EXAMPLE 1

A residual soft fat (1 part) having an iodine value of 26.0 obtained by fractionation of palm kernel oil according to a conventional method to separate off a hard butter fraction therefrom was dissolved in 99.5% acetone (4 parts) and cooled to $-5°$ C. with stirring. After maintaining at this temperature for 45 minutes, crystals separated out were filtered off and washed acetone at $-5°$ C.

Then, the solvent was removed from the filtrate to obtain the desired a soft fat (yield: 57.0%) having an iodine value of 35.4, a melting point of 13° C., and SFI (measured after maintaining at 0° C. for 20 hours, hereinafter the same measurement was employed) of 23.5 at 5° C., 6.0 at 10° C. and 0 at 15° C.

This fat had AOM stability time of 105 hours (Vitamin E 100 ppm is added to the fat, hereinafter the same procedure was employed), good melting in the mouth with cold mouth feel and a plain taste. On the other hand, refined soy bean oil had AOM stability time of 15 hours and an oily taste.

EXAMPLE 2

Palm kernel oil (1 part) was dissolved in 99.5% acetone (5.6 parts) and cooled to $-2°$ C. with stirring. After maintaining at this temperature for 20 minutes, crystals separated out were filtered off and washed with acetone at $-2°$ C. Then, the solvent was removed from the filtrate to obtain the desired soft fat (yield: 41.3%) having an iodine value of 31.6, a melting point of 14.5° C., and SFI of 28.6 at 5° C., 13.7 at 10° C. and 0 at 20° C.

The resulting fat had AOM stability time of 120 hours, and good melting in the mouth with cold mouth feel and a plain taste.

EXAMPLE 3

A residual soft fat (1 part) having an iodine value of 25.8 obtained by fractionation of palm kernel oil according to a conventional method to separate a hard butter fraction therefrom was dissolved in 99.3% acetone (4 parts) and cooled to $-7°$ C. with stirring. After maintaining at this temperature for 45 minutes, crystals separated out were filtered off and washed with acetone at $-7°$ C. Then, the solvent was removed from the filtrate to obtain the desired soft fat (yield: 56.1%) having an iodine value of 36.2, a melting point of 11.4° C., and SFI of 21.7 at 5° C., 4.8 at 10° C. and 0 at 15° C.

The fat had AOM stability time of 97 hours, and good melting in the mouth with cold mouth feel and a plain taste.

EXAMPLE 4

The soft fat having an iodine value of 25.8 (1 part) as used in Example 3 was dissolved in 99.3% acetone (4 parts) and cooled to −4° C. with stirring. After maintaining at this temperature for 45 minutes, crystals separated out were filtered off and washed with acetone at −4° C. Then, the solvent was removed from the filtrate to obtain the desired soft fat (yield: 56.1%) having an iodine value of 33.3, a melting point 13.8° C., SFI of 28.8 at 5° C., 13.9 at 10° C., 2.1 at 15° C. and 0 at 20° C.

The fat had AOM stability time of 115 hours, and good melting in the mouth with cold mouth feel and a plain taste.

EXAMPLE 5

Preparation of soft chocolate

By using the soft fat of fractionated palm kernel oil obtained in Example 1, chocolate was produced according to the following formulation. That is, a mixture of cacao mass (16 parts), whole milk powder (20 parts), powdered sugar (42 parts), the soft fat obtained by fractionation of palm kernel oil (22 parts), lecithin (0.5 part) and a suitable amount of vanillin was treated according to a conventional manner by refining, conching and tempering. The tempering could be carried out without any trouble. Then, the resulting mixture was cast in a pudding-shaped cup and rapidly cooled to obtain soft chocolate.

Although the resulting chocolate was allowed to stand at 20° C. for 21 days, no blooming was observed. The chocolate maintained softness at normal temperature without change in hardness with time and also had good melting in the mouth with pleasant cold mouth feel.

Preparation of ice chocolate

The same chocolate mixture as described above was treated by refining and conching without tempering, and then cast in the same shaped mold at 40° to 50° C. and rapidly cooled in a freezer to obtain ice chocolate.

Although the resulting chocolate was allowed to stand in a freezer for a month, it maintained hardness and also had good melting in the mouth with cold mouth feel. The ice chocolate was slightly softer than the above soft chocolate.

EXAMPLE 6

Preparation of chocolate for ice-coating

A mixture of cocoa (11 parts), powdered sugar (20 parts), coconut oil (20 parts), the soft fat of fractionated palm kernel oil (44 parts) obtained in Example 1, lecithin (0.5 part) and a suitable amount of vanillin was treated according to a conventional manner by refining and conching to obtain chocolate for ice-coating.

Although the resulting chocolate was warmed at 40° C. and then coated on the surface of ice-milk bar stored at −20° C., there was no trouble in workability such as drying period, viscosity thereof and the like. This chocolate had good melting in the mouth with pleasant cold mouth feel.

EXAMPLE 7

Preparation of molded (plate) milk chocolate

A mixture of cacao mass (15 parts), whole milk powder (20 parts), powdered sugar (35.5 parts), cacao butter (19 parts), the soft fat of fractionated palm kernel oil (10.5 parts) obtained in Example 1, lecithin (0.5 parts) and a suitable amount of vanillin was treated according to a conventional manner by refining, conching and tempering. The tempering could be carried out without any trouble. Then, the resulting mixture was cast in a mold (15 mm in width, 70 mm in length and 5 mm in thickness) and rapidly cooled to obtain molded chocolate.

Although the resulting chocolate was allowed to stand at 15° C. for 21 days, it maintained its original hardness and also had good melting in the mouth with pleasant cold mouth feel.

Preparation of chocolate for sandwiching

The same chocolate mixture as described above was treated by tempering, and then whipped at room temperature of 15° C. to obtain a whipped chocolate having the over-run of about 50%.

The resulting whipped chocolate was sandwiched between normal solid chocolate and biscuit.

Preparation of chocolate for coating

The same chocolate mixture as described above was treated by tempering, and then coated on a sponge cake.

Although the resulting confectionery were allowed to stand at 15° C. for 21 days, each chocolate maintained its original hardness and also had good melting in the mouth with pleasant cold mouth feel.

COMPARATIVE EXAMPLE 1

Soft chocolate was produced according to the same manner as described in Example 5 by substituting the soft fat of the fractionated palm kernel oil with palm oil. However, the tempering treatment could not carried out sufficiently because of increase in viscosity. Therefore, blooming was observed, and the resulting chocolate had no commercial value.

COMPARATIVE EXAMPLE 2

Chocolate was produced according to Example 6 by substituting the soft fat of fractionated palm kernel oil with soy bean oil. The resulting chocolate had no cold mouth feel.

EXAMPLE 8

Preparation of shortening

To a mixed fat of hydrogenated fish oil having a melting point of 36° C. (20 parts), hydrogenated fish oil having a melting point of 28° C. (50 parts) and the soft fat of fractionated palm kernel oil (30 parts) obtained in Example 2 were added glycerol fatty acid ester (0.4 part) and sorbitol fatty acid ester (0.4 part), and the mixture was heated to dissolve and disperse each ingredient. Then, the resulting mixture was treated according to a conventional manner by rapid cooling and conching in Votator to obtain shortening.

The resulting shortening (70 parts) was whipped by utilizing a coat mixer and sucrose syrup (70 Brix) was added to it when a over-run thereof reached at about 120%. Then, the mixture was slightly stirred to prepare butter cream having the over-run of about 100%.

Thus, the resulting butter cream had good melting in the mouth with pleasant cold mouth feel.

COMPARATIVE EXAMPLE 3

A butter cream was produced according the same manner as described in Example 8 by substituting the soft oil fractionated palm kernel oil with soy bean oil. The resulting butter cream was inferior to that of Example 8 in melting in the mouth and taste.

EXAMPLE 9

Preparation of coffee cream

A mixture of hydrogenated rapeseed oil having a melting point of 28° C. (15 parts), the soft oil of fractionated palm kernel oil (15 parts) obtained in Example 3, casein (4 parts), skim milk powder (3 parts), lecithin (0.1 part), sorbitol fatty acid ester (0.1 part), sucrose fatty acid ester (0.4 part), phosphate (0.15 part) and water (63 parts) was treated according to a conventional manner by pre-emulsifying, homogenizing, sterilization and cooling to obtain coffee cream.

The resulting coffee cream had the viscosity of 240 centipoise at 5° C. and also had creamy taste.

COMPARATIVE EXAMPLE 4

Coffee cream was produced according to the same manner as described in Example 9 by substituting the soft oil of fractionated palm kernel oil with rapeseed oil. The resulting coffee cream had the viscosity of 255 centipoise and also had an oil taste in comparison with that of Example 9.

Although both creams, prepared in Example 9 and Comparative Example 4 were directly exposed to sunlight for 30 minutes, the cream of Example 9 maintained its pleasant taste. On the other hand, the cream of Comparative Example 4 became extremely oily.

EXAMPLE 10

Fat for spraying

Each laurin fractionated soft fat prepared in Example 1-4 was sprayed on the surface of commercially available Japanese cracker in an amount of about 15 weight % based on the total weight of the cracker. For comparison, according to the same manner, a commercially available salad oill was sprayed on the same cracker. When the laurin fractionated soft fat prepared in the above Example was sprayed on the cracker, the product had a plain taste and good gloss. Therefore, this fat was suitable for use as a fat for spraying. On the other hand, when the salad oil was sprayed on the cracker, the product had an oily taste.

What is claimed is:

1. A fractionated soft fat of laurin fat having an iodine value of 30–40, a melting point of not higher than 15° C., and SFI of 10–30 at 5° C., 0–20 at 10° C., 0–10 at 15° C. and 0 at 20° C.

2. A fractionated soft fat according to claim 1, wherein the source of laurin fat is palm kernel oil.

3. A chocolate which comprises a fractionated soft fat of laurin fat having an iodine value of 30–40, a melting point of not higher than 15° C., and SFI of 10–30 at 5° C., 0–20 at 10° C., 0–10 at 15° C. and 0 at 20° C., wherein the fractionated soft fat of the laurin fat is in an amount of between 5–80% by weight of the fatty ingredients of the chocolate.

4. A chocolate according to claim 3, wherein the source of laurin fat is palm kernel oil.

* * * * *